(No Model.)

C. A. MAUS.
BREWER'S WAGON.

No. 244,067.　　　　　　　　Patented July 12, 1881.

WITNESSES:
John Mueller
G. H. Bennett.

INVENTOR.
Clement A. Maus.
Geo. E. Frink
his Attorney

UNITED STATES PATENT OFFICE.

CLEMENT A. MAUS, OF INDIANAPOLIS, INDIANA.

BREWER'S WAGON.

SPECIFICATION forming part of Letters Patent No. 244,067, dated July 12, 1881.

Application filed November 30, 1880. (No model.)

*To all whom it may concern:*

Be it known that I, CLEMENT A. MAUS, a citizen of the United States, residing at Indianapolis, in the county of Marion and State of Indiana, have invented a new and useful Improvement in Brewers' Wagons, of which the following is a specification.

My invention relates to improvements in the bed of brewers' wagons; and the object of my improvement is to provide a light, strong, and durable bed that is capable of sustaining any ordinary load. I attain this object by the mechanism illustrated in the accompanying drawings, in which—

Figure 1:
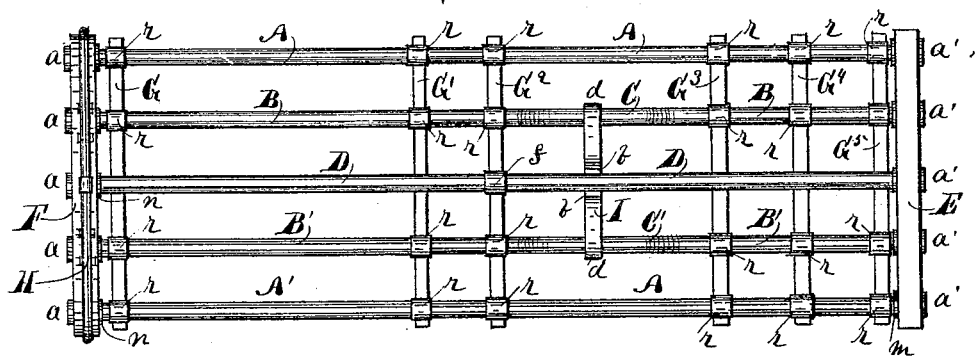
Figure 2:
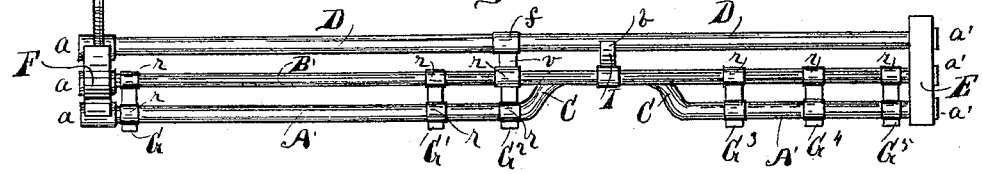

Figure 1 represents a top or plan view of the wagon-bed. Fig. 2 is a side elevation of the same, and Fig. 3 is a rear end elevation.

Similar letters refer to like parts throughout the several views.

A A', B B', and D represent the longitudinal bars of the bed, which are made from wrought-iron pipe, either plain or galvanized. The ends of these longitudinal bars or pipe-rods are made fast into the wooden end cross-pieces, E F, as shown. The two outer pipe-bars, A A', are inserted in holes formed in the ends of the end pieces, E F, while the rear end of the central elevated pipe-rod, D, rests in a groove formed in the central upper part of the rear end piece, F; and its front end is made fast in a hole in the front end piece, E. The rear ends of the lower pipe-rods, B B', are also secured in notches formed in the base of the rear end piece, F, as shown, and are secured to said cross-piece by clips $i$.

Figure 3:
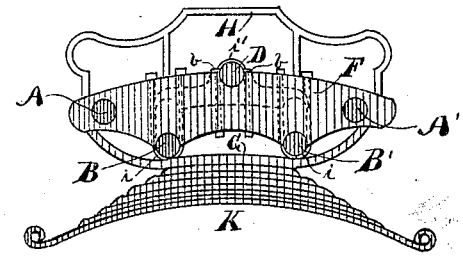

The cross-brace G, near the rear ends of the pipe-rods, is made fast thereto by the clips $r\ r\ r\ r$, and is mounted on the rear cross-spring, K, as shown in Fig. 3. The front cross-bars, $G^3$ $G^4$ $G^5$, are made fast to the pipe-rods in the same manner by clips $r$, and form a platform for the front hounds of the vehicle. The central cross-bar, $G'$, is secured to the pipe-rods A, B B', and A by like clips $r$, while the central cross-brace, $G^2$, is not only secured to the same pipe-rods by clips $r$, but to the elevated central rod by the eyebolt $f$ and stud $v$, thus forming a central support to the central rod, D.

The side pipe-rods, B B', are curved upward at C C', in front of the central cross-bar, $G^2$, and at the rear of the front cross-bar, $G^3$, to permit the wheels of the vehicle to pass under it. The upper surface of the bends C C' in the pipe-rods B B' is level with the top of the side pipe-bars, A A', as shown in Fig. 2. The bent parts C C' of the side pipe-bars, B B', are united by a short cross-bar, I, the ends $d$ of which are firmly secured by clips to the bent parts C C', and the central portion is provided with a recess, in which the central pipe-rod, D, is held, thus forming another support for the central pipe-rod, and at the same time preventing the curved or bent parts C C' of the rods B B' from turning down, which otherwise might be the case, owing to the constant jarring of said parts in loading or in passing over bowldered streets.

The rear end piece, F, is provided with the usual end guard-rail, H, and the driver's seat (which is not shown) is mounted on the front cross-piece, E, in the usual manner.

I am aware that prior to my invention brewers' wagons have been made with wooden rails laid with iron to prevent wear, somewhat similar in general appearance to my present invention. I therefore do not claim such a construction, broadly; but What I do claim as my invention, and desire to secure by Letters Patent, is—

1. In a brewer's wagon, the bed consisting of the straight wrought-iron pipe-bars A A' and D, the wrought-iron side pipe-bars, B B', with bent part C C', the short brace I, the end supports, E F, and braces G G' $G^2$ $G^3$ $G^4$ $G^5$, all constructed and arranged in the manner substantially as shown and described.

2. In a brewer's-wagon bed, the side pipe-bars, B B', having bent parts C C', combined with the brace I and central pipe-bar, D, substantially as shown and described.

In testimony whereof I have signed my name to this specification in the presence of two subscribing witnesses.

CLEMENT A. MAUS.

Witnesses:
E. O. FRINK,
G. H. RENNETT.